United States Patent [19]
McCambridge

[11] Patent Number: 5,125,089
[45] Date of Patent: Jun. 23, 1992

[54] ASYNCHRONOUS-TO-SYNCHRONOUS PARALLEL WORD TRANSFER CIRCUIT FOR PREVENTING INCOMING ASYNCRONOUS PARALLEL BYTE DATA FROM INTERFERING WITH OUTGOING SYNCHRONOUS DATA

[75] Inventor: John M. McCambridge, Northville, Mich.

[73] Assignee: Chrysler Corporation, Highland Park, Mich.

[21] Appl. No.: 732,434

[22] Filed: Jul. 18, 1991

Related U.S. Application Data

[63] Continuation-in-part of Ser. No. 286,194, Dec. 19, 1988, abandoned.

[51] Int. Cl.$^5$ .............................................. G06F 1/04
[52] U.S. Cl. .............................. 395/550; 364/DIG. 2; 364/950; 364/950.1; 364/950.3; 370/58.1
[58] Field of Search ....................... 370/58.1, 101; 364/200 MS File, 900 MS File

[56] References Cited

U.S. PATENT DOCUMENTS

| | | | |
|---|---|---|---|
| 4,352,180 | 9/1982 | Schulze | 370/58.1 |
| 4,434,498 | 2/1984 | Mathieu | 370/101 |
| 4,497,054 | 1/1985 | Read | 370/67 |
| 4,638,478 | 1/1987 | Hatabe | 370/101 |
| 4,669,080 | 5/1987 | Aveneau et al. | 370/101 |
| 4,759,014 | 7/1988 | Decker et al. | 370/84 |
| 4,885,739 | 12/1989 | Read et al. | 370/58.1 |
| 4,970,679 | 11/1990 | Tachibana | 364/900 |

Primary Examiner—Thomas C. Lee
Assistant Examiner—Mehmet Geckil
Attorney, Agent, or Firm—Wendell K. Fredericks

[57] ABSTRACT

A synchronization circuit synchronizes asynchronous parallel byte words input data with synchronous parallel byte output data so as not to glitch or interrupt required regular flow of synchronous data to end user devices.

4 Claims, 3 Drawing Sheets

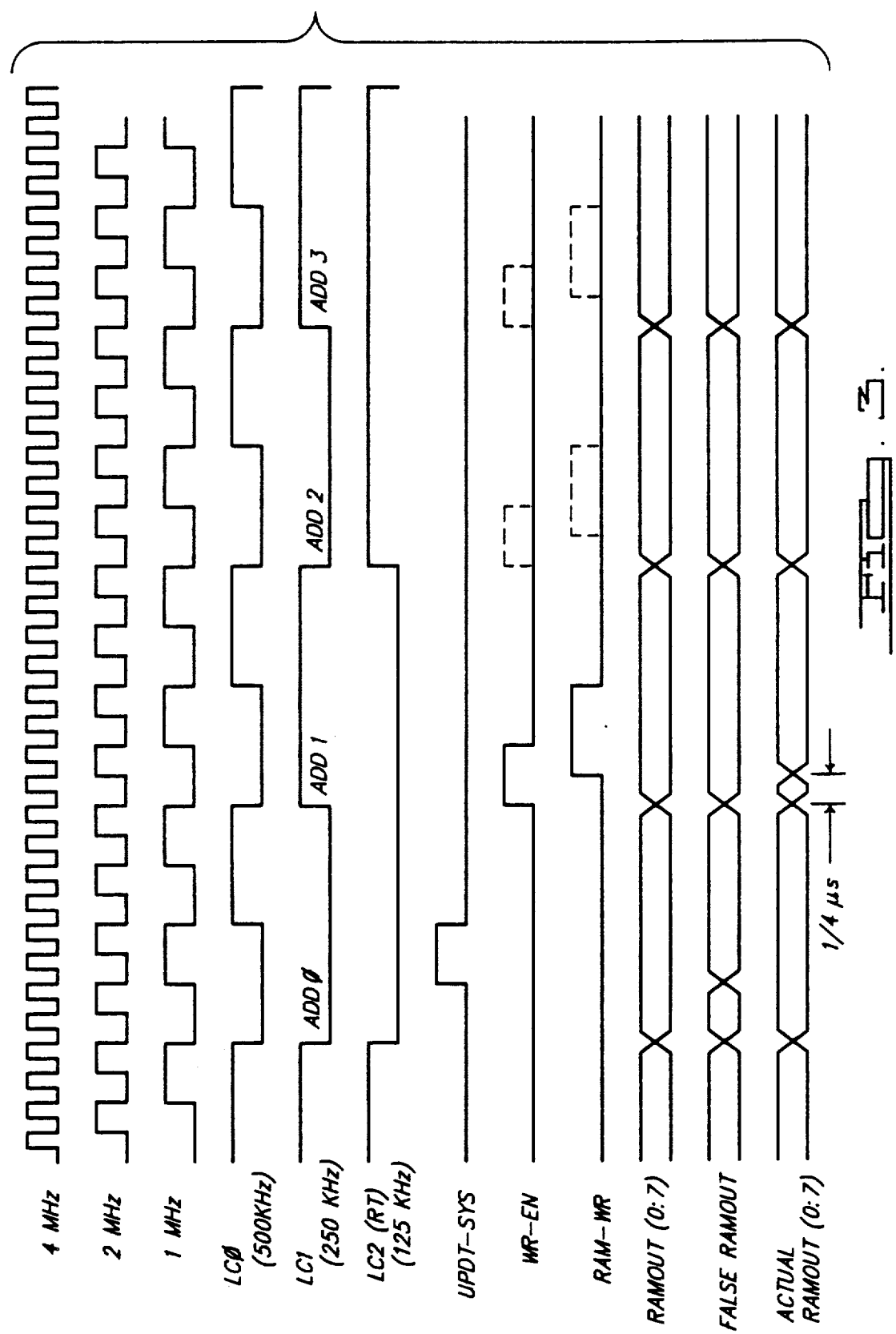

ASYNCHRONOUS-TO-SYNCHRONOUS PARALLEL WORD TRANSFER CIRCUIT FOR PREVENTING INCOMING ASYNCRONOUS PARALLEL BYTE DATA FROM INTERFERING WITH OUTGOING SYNCHRONOUS DATA

This is a continuation-in-part of U.S. patent application Ser. No. 07/286,194 filed Dec. 19, 1988 now abandoned.

BACKGROUND OF THE INVENTION

1. Field of the Invention

The present invention relates generally to data synchronization and, more particularly, to an improved asynchronous-to-synchronous parallel byte data transfer circuit.

2. Prior Art

U.S. Pat. No. 4,885,583 dated Dec. 5, 1989 of the present inventor describes a system that receives asynchronous serial messages of different lengths for different receivers and converts them to asynchronous parallel word messages. Besides data converting, this system also provides framing error and voltage and current out-of-range signals.

Co-pending U.S. application Ser. No. 286,196 entitles "Bus Receiver Powerup Synchronization and Error Detection Circuit" of the present inventor, filed Dec. 19, 1988, now U.S. Pat. No. 5,012,442, describes a system that synchronizes receipt of parallel data messages transferred asynchronously as three byte words preceded and succeeded by idle bytes so as to receive complete and not partial messages. Also, this system scrutinizes the messages for faults and for too many or too few bytes.

U.S. Pat. No. 4,977,599 dated Dec. 11, 1990 of the present inventor entitled "Improper Bit Combination Detection Circuit" describes combinational logic circuits used with a temporary storage device for holding data bytes which detects improper bits in both the lower and upper nibbles of the bytes. Combinations of bit patterns derived from both nibbles permit flagging the occurrences of a variety of bit errors existing in asynchronously transmitted parallel data bytes.

The present invention, as taught herein, may be used in cooperation with the structures claimed in the above patents and application.

A problem exists when destination code words and associated data words in a message transferred over a communications bus gets received by a data reception device in an asynchronous order and a need exists to file such data in a defined sequence to a plurality of end use devices such as meters and gauges in a vehicle. Effort was expended to develop means for solving this type of problem. That effort ended in the present invention.

SUMMARY OF THE INVENTION

The present invention concerns a novel data transfer circuit which prevents incoming, updating, asynchronous end-use data from interfering with outgoing, required, syncrhonous transmissions of end-use data to end-use devices. This transfer circuit interfaces with circuits that provide asynchronously transferred parallel messages and an update flag or signal that indicates the presence of a new message.

The transfer circuit includes a static RAM circuit for receiving and temporarily holding updated asynchronous parallel words in response to the update signal. Upon the receipt of the update signal, a WRITE-TO-RAM enable circuit stores or delays the update signal for a chosen period of time before setting up a write enabling signal. Then the transfer circuit uses a RAM-WR GENERATOR device, enabled by the write enabling signal, to syncrhonize the lower three bits of the destination data (BYTE 1), the destination code, with the occurrences of sequential address clock signals (LC1-LC3) sequentially generated by a clock generator. When the destination code equals the sequential address clock signal, and barring any errors, a RAM-WR signal is generated thus enabling the writing the updating data (BYTE 0) to RAM. This writing to RAM now does not interfere with regular flow of synchronous data from RAM to the end-use device.

The RAM-WR signal also resets the WRITE-TO-RAM enable circuit enabling the write enabling signal to synchronize the next asynchronous update data (BYTE 0).

BRIEF DESCRIPTION OF THE DRAWING FIGURES

FIG. 3 depicts in a timing diagram the time sequence of the signals applied to the circuits of FIG. 2 and the asynchronous input and synchronous output signals from RAM.

DETAILED DESCRIPTION OF A PREFERRED EMBODIMENT

Figure 1:
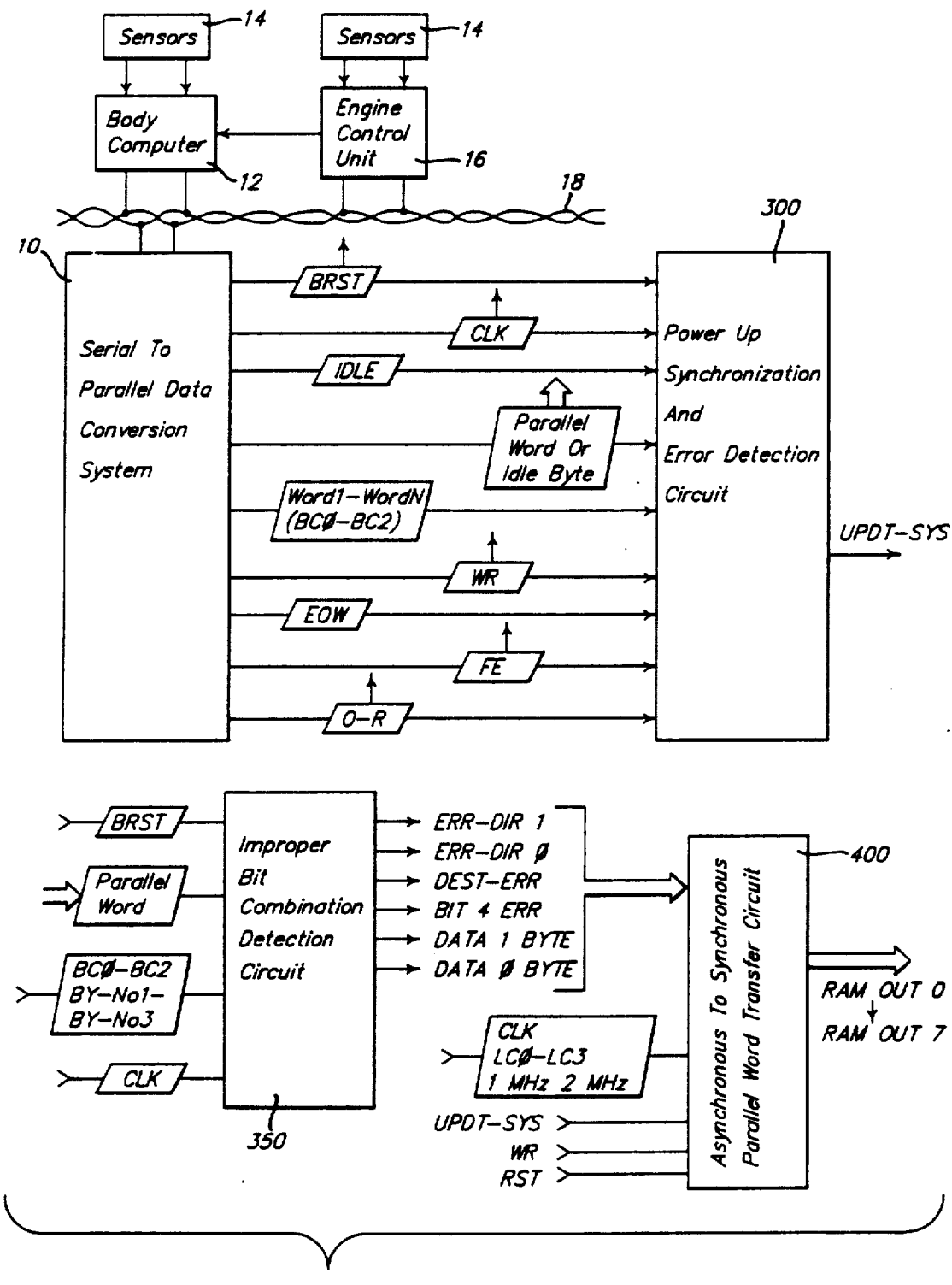
FIG. 1 illustrates in block diagram form a data reception device which connects to a data link and which contains the asynchronous-to-synchronous parallel word transfer circuit.

Referring now to FIG. 1 where an illustration depicts a data reception device in a communication system containing an asynchronous-to-synchronous parallel word transfer circuit. The data reception device includes a serial to parallel data conversion system 10, a power-up synchronization and error detection circuit 300, an improper bit combination detection circuit 350, and the asynchronous-to-synchronous parallel word circuit 400.

A body computer 12 acts as a transmitter for transmitting serial data to system 10 of the receiver over data link 18. Analog sensors 14—14 provide analog signals concerning illustratively, a variety of parameters that depict operational and physical conditions of a motor vehicle to at least two different computing devices, namely, the body computer 12 and an engine control unit 16. These two computing devices convert the analog sensor signals into corresponding digital signals. The body computer 12 essentially consolidates the converted digital sensor data and forms serial messages describing the sensed data and then broadcasts the sensor messages over link 18 to multiple transceivers and data reception devices connected link 18.

SERIAL TO PARALLEL DATA CONVERSION SYSTEM

Serial to parallel data conversion system 10 converts the serial sensor messages into parallel byte words and at the same time scrutinizing the bits of serially received data for framing errors and over-range voltage levels of each bit due to noise on the link.

POWERUP SYNCHRONIZATION AND ERROR DETECTION CIRCUIT

The power-up synchronization and error detection circuit 300 tries to synchronize the receipt of a three-byte message in packet format. After circuit 300 generates an UPDT-SYS signal using the first byte, the ID byte of the three byte message, the improper bit combination detection circuit 350 loads the other two bytes, the DATA Q (the destination data codes) and DATA destination 1 (the data codes) bytes into temporary holding registers.

IMPROPER BIT COMBINATION DETECTION

Circuit 350 scrutinizes the outputs of the temporary registers for improper bit combinations in the bytes stored therein. After checking for improper bit combinations of DATA 1 words stored in temporary storage of system 350 of FIG. 1, transfer of DATA 0 data to system 400 commences, provided proper combinations of bits of the DATA 1 word exist.

ASYNCHRONOUS-TO-SYNCHRONOUS TRANSFER OF PARALLEL WORDS

Figure 2:
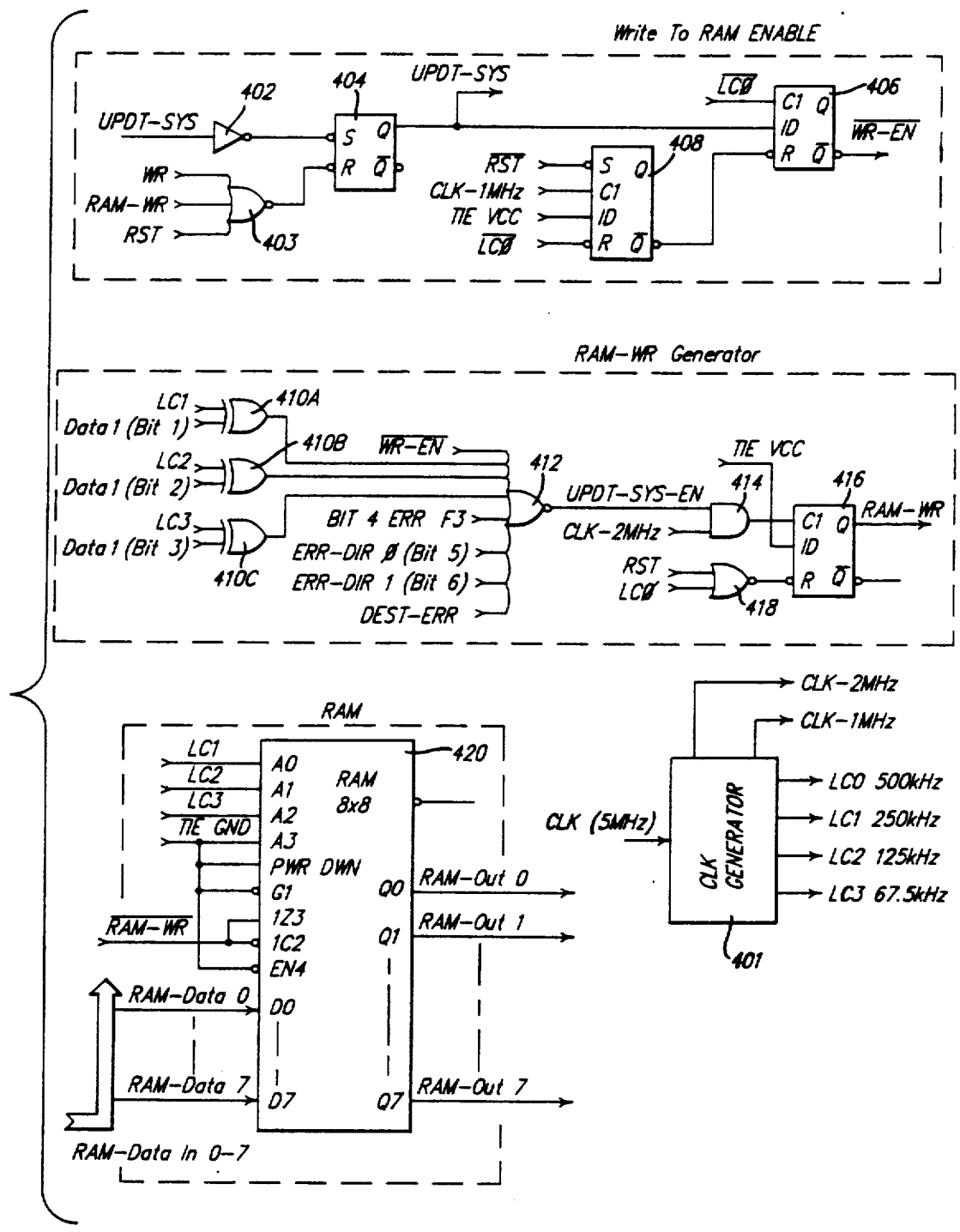
FIG. 2 illustrates in schematic diagram form the combinational and sequential logic circuits of the asynchronous-to-synchronous parallel word transfer circuit.

System 400, an asynchronous-to-synchronous transfer of parallel word circuit, writes DATA 0 words into RAM 420 of FIG. 2 in a manner that does not interfere with the synchronous reading of RAM-OUT 0-7 data by end-user devices. RAM 420 contains eight bytes, each byte contains eight bits, and the clock signals LC1-LC3 from clock generator 401 sequentially addresses the eight byte locations. The clock signal LC1 initiates reading of each byte of RAM 420 as indicated in FIG. 3 and a $\overline{RM\text{-}WR}$ signal initiates writing RAM-DATA 0-7 data into byte locations of RAM 420.

WRITING TO RAM

Each time system 300 of FIG. 1 sends asynchronously occurring WR and UPDATE-SYS pulse signals to circuit 400, circuit 400 delays writing of this new DATA 0 data until an appropriate time occurs which does not substantially interfere with the sequential reading of the output of RAM 420 by end-user devices. Before writing DATA 0 data into RAM 420, a $\overline{WR\text{-}EN}$ and a $\overline{RAM\text{-}WR}$ signal must occur.

GENERATION OF A $\overline{WR\text{-}EN}$ SIGNAL

When asynchronous data routes to RAM 420, A WRITE pulse (WR) from the Power Up Asynchronization and Error Detection Circuit 300 precedes the arrival at circuit 400 of the UPDATE-SYS signal from the serial to Parallel Data Conversion System 10. A high WR signal into NOR gate 403 produces a low output signal used to reset R-S latch 404. Hence, when the UPDATE-SYS arrives at an input of inverter 402, a low signal results which sets latch 404 generating a latched UPDATE-SYS signal at a Q output.

A D-type positive edge-triggered flip-flop 406 samples the latched UPDATE-SYS signal and then transfers it to a $\overline{Q}$ output terminal as a $\overline{WR\text{-}EN}$ signal. This happens upon the occurrence of a $\overline{LC0}$ signal at a clock input terminal of flip-flop 406, the $\overline{LC0}$ signal occurring, illustratively, every 2 μs. Flip-flop 406 stores the latched UPDT-SYS signal for a duration of, illustratively, 0.5 μs. in response to a rising edge of the CLK-2 MHz signal as indicated in FIG. 3.

RAM-WR SIGNAL

To write the DATA 0 data to RAM 420, a RAM-WR signal must occur. This signal results when a low $\overline{WR\text{-}EN}$ signal occurs, the circuit 400 receives a proper address code and this proper address code also addresses the byte location in RAM that will receive the updated DATA 0 data.

With the $\overline{WR\text{-}EN}$ signal occurring every 2 μs after receipt of the UPDT-SYS signal, the clock generator 401 steps the LC1, LC2 and LC3 outputs after every falling edge of the LC0 signal until a match occurs between the states of bits 1-3, the lower three bits of the destination code DATA1 bytes and LC1-LC3 clock signals.

When a match results, a logical 0 exists at the output of exclusive OR gates 410 A,B and C and, if the remaining bits of the destination code DATA 1 byte do not generate any error signals, then a logical 1 UPDT-SYS-EN signal exists at the output of NOR gate 412.

With the UPDT-SYS-EN signal at a logical 1 on the next rising edge of the CLK-2 MHz signal from clock generator 401, D-flip flop 401 samples a logical 1 VCC signal and transfers it to a $\overline{Q}$ output as logical 1 RAM-WR signal.

The address imputs to RAM 420 change on the falling edge of LC0. Upon every address change, the data outputs of the RAM 420 changes.

The logical 1 RAM-WR signal is delayed by 0.25 μs from the falling edge of LC0, so to afford adequate settling time. Once the RAM-WR signal is high, the Data 0 data is written into the byte location of RAM 420 designated by the clock signal address code. In addition to maintaining synchronization with the end user hardware, the RAM-OUT follows the DATA 0 data at the RAM imputs, similar to a normal read function.

FURTHER SYSTEM OPERATIONS CONCERNING FIG. 3

As shown in FIG. 3, the end-user devices read RAM-OUT (0-7) signals in response to every edge of the LC1 signal.

If system 400 transferred DATA0 data to RAM 420 in response to the rising edge of UPDT-SYS signal only, interruption to the required regular flow of synchronous data to the end-user devices would occur as indicated in the waveform labelled "False RAM-OUT Condition".

To minimize the interruption, the WR-EN circuit stores the UPDT-SYS signal and then permits writing to RAM upon the occurrence of the rising edge of the RAM-WR signal. The Actual RAM-OUT (0-7) data flow condition waveform of FIG. 3 depicts the maintenance of the nearly smooth and regular flow of RAM-OUT (0-7) data when asynchronously received update data enters system 400.

The dotted WR-EN and RAM-WR pulses depict the WR-EN signal repeating until a match occurs between the fixed address of system 400 and the destination address in the lower three bits of the destination DATA 1 byte.

I claim:

1. An asynchronous-to-synchronous parallel word (A-SPW) transfer circuit for preventing incoming, updating, asynchronous, end-user parallel byte data from interfering with outgoing synchronous transmission of sequential parallel byte data to end-user devices, said (A-SPW) transfer circuit receiving a first signal (WR) indicative of the occurrence of asynchronous parallel byte update data and a second signal indicative (UPDT-SYS) of availability of said asynchronous parallel byte update data, said asynchronous parallel byte update data providing a destination code byte and a data byte, said destination code byte providing location for storing said data byte information and information concerning bit error problems within said destination code byte, said (A-SPW) transfer circuit also receiving a system clock signal for establishing a reference clock for timing clocked components of said (A-SPW) transfer circuit, said (A-SPW) transfer circuit comprising:

(a) a clock generator, receiving at an input terminal, the system-clock signal and producing therefrom at output terminals a plurality of separate clock signals of chosen fixed values derived from dividing the system-clock signal frequency successively by increasing powers of a chosen radix;

(b) first logic means having input terminals for receiving the WR signal, the UPDT-SYS signal and a first separate fixed value clock signal derived by dividing said system-clock signal frequency by a first power of said radix and producing therefrom at an output terminal a $\overline{\text{write-enable pulse}}$ signal ($\overline{\text{WRITE-EN}}$) that substantiates the availability of asynchronous parallel byte update data;

(c) address logic means receiving at input terminals three lower bits of said destination byte in conjunction with a fourth, fifth and sixth separate fixed value clock signals derived by dividing said system-clock signal frequency by a fourth, fifth and sixth power, respectively, of said radix along with destination error information contained in the remaining bits of said destination code byte and after comparing the three lower bits with the fourth, fifth and sixth fixed value clock signals and finding coincidence, producing therefrom, at an output terminal within a chosen time period based on a separate fixed clock signal derived by dividing said system clock signal frequency by a zero power of said radix, a RAM-WRITE (RAM-WR) signal enabling said A-SPW transfer circuit to accept said upward data (DATA 0) byte;

(d) a RAM means having input terminals for receiving an address code comprised of the fourth, fifth and sixth fixed value clock signals and other input terminals for receiving said DATA 0 byte and a separate input for receiving said RAM-WR signal and after using said address code to find an address location in RAM coincident with the address code, storing said DATA 0 byte in the RAM location within a time period substantially coincident with the second fixed value clock signal such that updated data enters the regular flow of synchronous data (RAM-OUT 0–7) data to end user devices with substantially no interruption, wherein reading of said RAM by said end user devices occurring on each occurrence of said second fixed value clock signal.

2. Apparatus in accordance with claim 1 wherein said system-clock frequency is 4 MHz and said radix value is two and wherein said powers of said radix range from 1 to 6.

3. Apparatus in accordance with claim 2 wherein said WR signal is used to reset said first logic means before receipt of said UPDT-SYS signal and another separate fixed value clock signal derived from dividing the system clock signal frequency by a second power of the radix is used to reset said first logic means after the generation of the $\overline{\text{WR-EN}}$ signal, and wherein said RAM-WR signal generates at a time substantially coincident with the second separate fixed value clock signal so that writing to said RAM occurs substantially in synchronization with reading said RAM.

4. Apparatus in accordance with claim 2 wherein said remaining bits of said destination code byte are used to inhibit transfer of the DATA 0 byte if a problem exists with the address information or the format of the destination byte.

* * * * *